(No Model.) 2 Sheets—Sheet 1.

J. C. LOOK.
AIR BRAKE COUPLING.

No. 598,347. Patented Feb. 1, 1898.

Witnesses, Inventor,
John C. Look
By Dewey & Co.
Attys (No Model.) 2 Sheets—Sheet 2.
J. C. LOOK.
AIR BRAKE COUPLING.
No. 598,347. Patented Feb. 1, 1898.
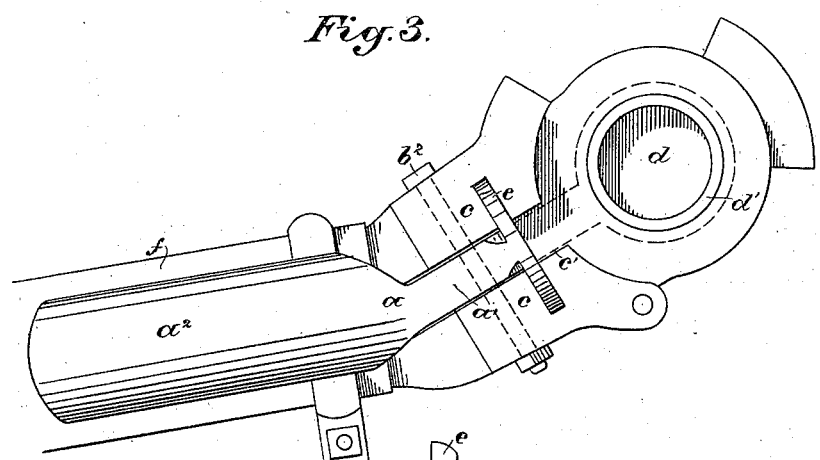
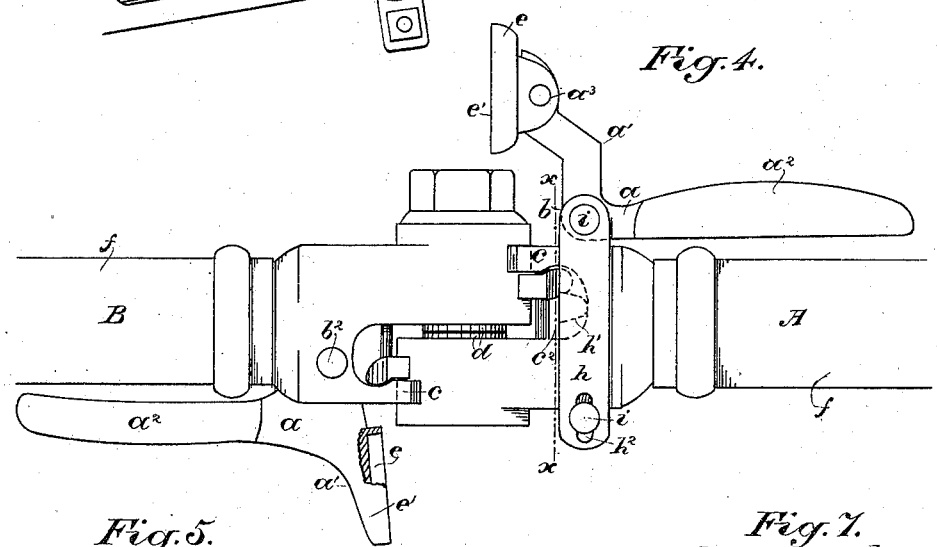
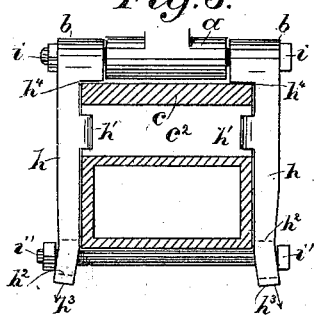
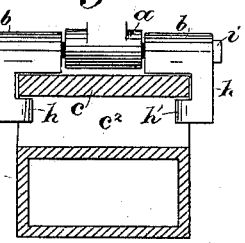
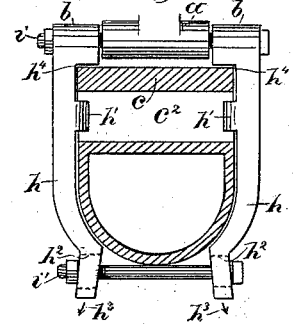
Witnesses,
Inventor
John C. Look
By Dewey & Co.
Attys

UNITED STATES PATENT OFFICE.

JOHN C. LOOK, OF SAN JOSÉ, CALIFORNIA.

AIR-BRAKE COUPLING.

SPECIFICATION forming part of Letters Patent No. 598,347, dated February 1, 1898.

Application filed March 29, 1897. Serial No. 629,787. (No model.)

*To all whom it may concern:*

Be it known that I, JOHN C. LOOK, a citizen of the United States, residing at San José, county of Santa Clara, State of California, have invented an Improvement in Air-Brake Couplings; and I hereby declare the following to be a full, clear, and exact description of the same.

The object of the invention is to provide a dust-cap for the air-port of the coupling that will close automatically when the coupling is released and open automatically or by hand when the coupling is to be connected.

The coupling in common use on railway-cars for connecting the air or train pipes is made with a port at right angles to the line of pipe. A compressing-arm stands out some distance from the face of the coupling and rearwardly of the port, said arm being for the purpose of acting in connection with a counterpart of the opposite coupling to effect the connection. Now when the coupling is hanging down, which is the usual or desired way when the coupling is disconnected, the said port is open laterally and the compressing-arm stands out laterally from the perpendicular face of the port. In this position the port gathers in the dust and cinders. To provide an effective dust-cap for the said port, of both those already in use and those hereafter to be manufactured, is the object sought.

Referring to the accompanying drawings for a more complete explanation of my invention, Figure 1 represents the coupling hanging in its normal position, the dust-cap being partly in section. Fig. 2 is a top view with the dust-cap turned out. Fig. 3 is a face view with the dust-cap turned out. Fig. 4 is a top view of two couplings united, one coupling being of a new pattern and one of the kind now in use with the dust-cap attached. Fig. 5 is a cross-section taken on line $x$ of Fig. 4. Fig. 6 is a cross-section taken on the same line as Fig. 5, with a different form of attachment. Fig. 7 is a cross-section of a different shaped coupling, taken on the same line $x$ as Fig. 5.

The improvement consists of the crank-shaped lever $a$, Fig. 1, pivoted between ears $b\ b$. (See also Fig. 5.) One end of the said lever $a'$ projects in line and is curved in such a manner that it passes over the compressing-arm $c$ and reaches the air-port $d$. In the normal hanging position this port $d$ is not in the perpendicular line of the ears $b$. Therefore a part $a^2$ in the shape of a handle is made integral with the part $a'$ and of a greater weight than the said part $a'$ and projects at a substantially right angle to the said part $a'$. This gives the power to press the part $a'$ past the perpendicular of the pivot $b$ toward the port $d$. This power could be furnished by a spring; but I prefer to use a weight. At the end of the lever $a'$ is the dust-cap $e$, which closes the port $d$ when the coupling is hanging loose, as in Fig. 1. When a connection is to be made, the dust-cap is raised by pressing the handle $a^2$ toward the pipe $f$, as in dotted lines, Fig. 1, or as in Fig. 2, or by tilting into the coupling position, as seen in Fig. 3, where the preponderance of weight contained in the handle $a^2$ and the incline being then in that direction opens it automatically, and when the connection is effected the dust-caps remain as indicated in Fig. 4.

Such is the construction of the coupling that those hereafter manufactured may differ materially in the position of the pivot of the lever $a$. Fig. 1 shows ears $b$ cast integral with the compressing-arm $c$; but in Figs. 2 and 3 the compressing-arm $c$ is bifurcated, as at $c'$, and the pivot placed as far in as possible, as at $b^2$. With this arrangement very much less material can be used in the handle $a^2$ of the lever, as the pivot $b^2$ is nearly in the plane of the port $d$.

Fig. 4, part A, and Figs. 5 and 7 show the method of attachment of those that are already in use. It consists of clamps $h\ h$, placed each side of the coupling and bolted transversely above and below at $i$ and $i'$, the upper bolt $i$ serving as the pivot for the lever $a$. Bosses $h'\ h'$ enter the recess $c^2$ to hold the clamps from slipping toward the pipe end $f$, (see Fig. 4,) and it cannot move in the opposite direction, as the coupling increases in size in that direction, as may be observed in Fig. 3. To still further secure the stability of the clamps, the outside ends $h^2\ h^2$ are slotted in its length that the bolt $i'$ may be placed close to the back of the coupling as the couplings vary in size; and also these ends $h^2\ h^2$ flare outwardly from the coupling in the direction of the arrows $h^3\ h^3$ to hold the bolt $i'$ toward the coupling, and thus tend to draw the shoulders $h^4$ $h^4$ toward the compressing-arm $c$, and so making everything firm and permitting no moving in any direction.

Fig. 6 dispenses with the bolt $i'$ by making the bosses $h'$ $h'$ fit more snugly under the arm $c$. This kind can be used where a number of couplings have been made from the same pattern and an even thickness of the arm $c$ has been obtained.

Fig. 7 is similarly constructed as Fig. 5.

In Fig. 3 it will be seen that the handle $a^2$ is not in the same line as the part $a'$. This is curved to conform to the curvature at the junction of the coupling and air-pipe, in order that the handle $a^2$ and pipe may be grasped at the same time in the act of coupling, as such is the manner of using these couplings that this bend is quite necessary.

The dust-cap $e$ may be made in several different patterns. Figs. 1 and 4, part A, show the best form, though not the cheapest. In these figures this cap is connected loosely to the lever $a'$ at $a^3$ in any convenient manner. This cap has a rim $e'$, which extends out and rests on the face of the coupling, as at $e^2$ $e^2$, and does not touch the gasket $d'$, and thus while keeping the dust out protects the gasket as well, and by being loosely connected in the center every part of the rim $e'$ rests on the face of the coupling. These rims may also be faced with rubber.

Fig. 3 shows a disk made integral with the part $a'$ of the lever, and at Fig. 4, part B, the cap is also integral with the lever, but has the rim $e'$. These two last mentioned may be used to advantage in cheapness on those hereafter to be manufactured, as the pivot $b^2$ can be placed with greater precision.

Figure 1:
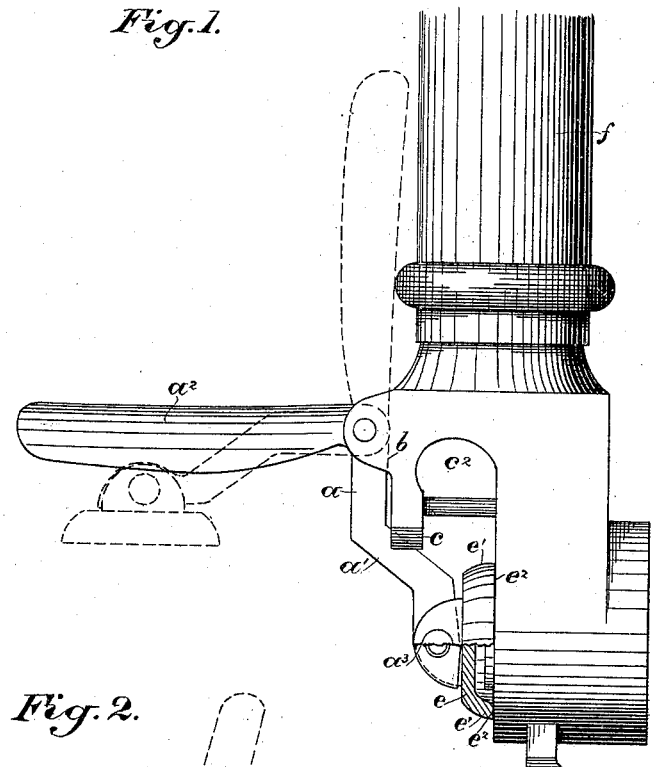
Figure 2:
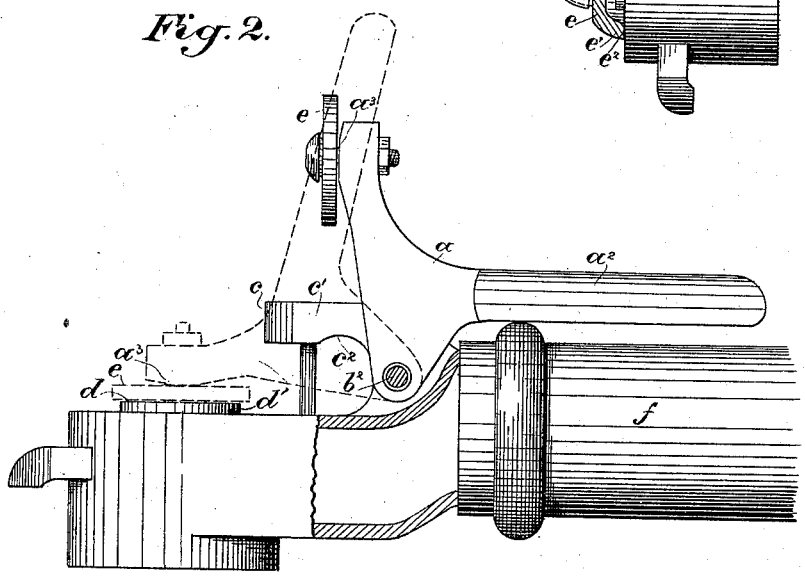
Fig. 2 shows a disk loosely connected and resting on the gasket $d'$.

Having thus described my invention, what I claim as new, and desire to secure by Letters Patent, is—

1. In a train-pipe coupling, a device for closing the port, consisting of a crank-shaped lever, pivoted in the line of the direction of the pipe, and outwardly from the line of the perpendicular face of the coupling, said lever being provided at the lower or port end with a cap, and at the upper end with a weight resting outwardly from the pivot, of sufficient power to hold the cap against the port when the coupling is separate and dependent.

2. In an air-brake coupling, a device for closing the port consisting of a crank-shaped lever, pivoted in the line of the direction of the pipe, and outwardly from the line of the perpendicular face of the coupling, said lever being provided at its lower or port end with a cap, and at its upper end with a handle bent to conform to an angle in the said pipe, said handle resting outwardly, and of sufficient weight to hold the said cap against the port when the coupling is separate and dependent.

3. In a train-pipe coupling, a device for closing the port, consisting of a crank-lever pivoted to the casting of the coupling in the line of the direction of the pipe, with a loose end thereof provided with a cap, and a weight as part of the device resting outwardly from the pivot, of sufficient power to hold the cap against the port when the coupling is separate and dependent, and the said device to open automatically by reason of the weight when the coupling is tilted beyond the perpendicular axial line of the pivot.

4. An air-brake coupling having a compressing-arm standing out from the face of the coupling, said arm being bifurcated to admit therethrough a pivoted device for closing the port of the coupling.

5. An air-brake coupling having a compressing-arm standing out from the face of the coupling, said arm being bifurcated to admit therethrough a pivoted device for closing the port of the coupling, said device being pivoted in the coupling, with a loose end thereof provided with a cap for closing the port, and a suitable handle as part of the device standing outwardly for the purpose of operating the said device.

6. In an air-brake coupling having a port with a raised gasket, a device for closing the port, one part of which is pivoted to the coupling, and an end provided with a hollow cap, said cap being of sufficient depth and width to go over the gasket and rest on the face of the coupling without being in contact with the said gasket.

7. In an air-brake coupling having a port with a raised gasket, a device for closing the port, one part of which is pivoted in the coupling, and an end provided with a hollow cap loosely connected thereto, said cap being of sufficient depth and width to go over the gasket and rest on the face of the coupling without being in contact with the said gasket.

8. In an air-brake coupling having a compressing-arm laterally from the port, a pivoted device for closing the port, clamps secured to the coupling at the cross-section of the compressing-arm and in connection therewith for the purpose of providing ears in which to pivot the said port-closing device.

9. In an air-brake coupling, a pivoted device for closing the port, clamps secured to the coupling for the purpose of providing ears in which to pivot the said port-closing device, said clamps being provided with bosses for recesses in the coupling, and slotted holes with inclines in connection therewith for holding the clamps more firmly in place.

In witness whereof I have hereunto set my hand.

JOHN C. LOOK.

Witnesses:
S. H. NOURSE,
JESSIE C. BRODIE.